Patented Aug. 22, 1939

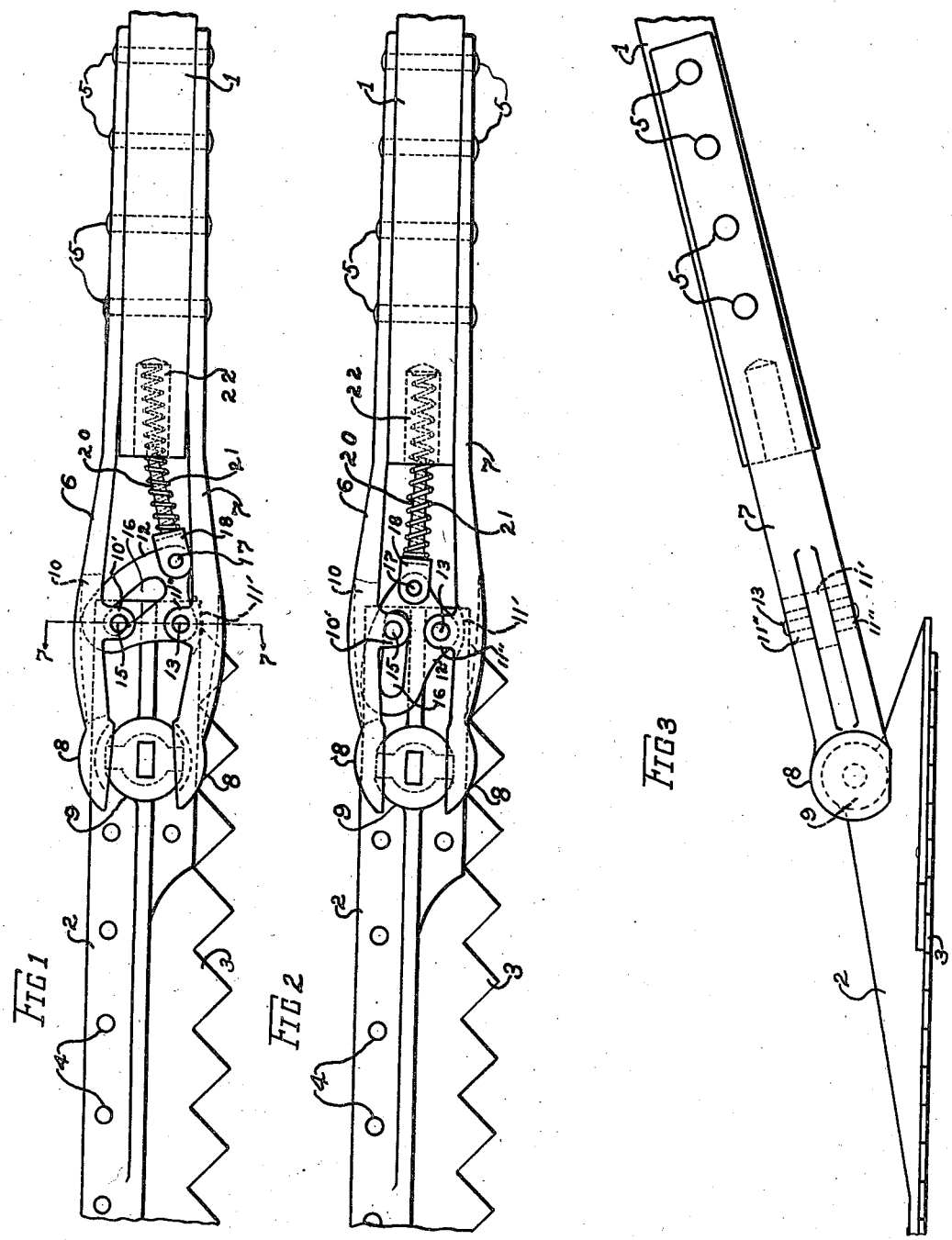

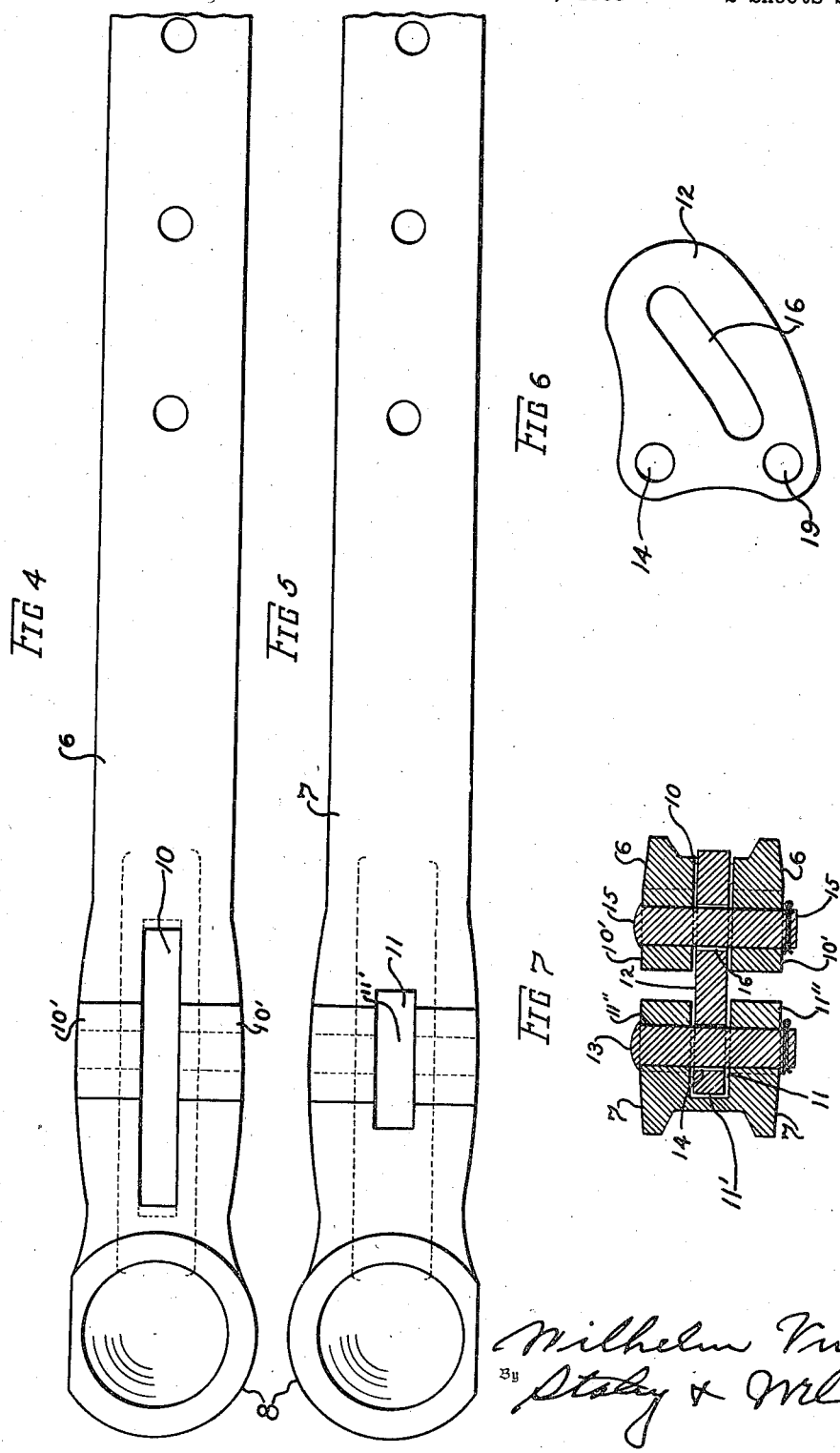

2,170,042

UNITED STATES PATENT OFFICE 2,170,042

CONNECTION FOR PITMAN RODS

Wilhelm Vutz, Coldwater, Ohio, assignor to New Idea, Inc., Coldwater, Ohio, a corporation of Ohio Application March 28, 1938, Serial No. 198,412

4 Claims. (Cl. 287—89)

This invention relates to a connection for a pitman rod and knife head, it more particularly relating to a connection for securing a pitman rod to the head of a reciprocating knife such as employed in grass mowers, and the like.

The object of the invention is to provide a connection between the pitman rod and the knife head which will operatively position the parts together and which will permit the rod and knife head to be more quickly and readily separated when desired.

A further and more specific object of the invention is to provide spring-operated cam means which will operate upon the parts to position them together and which may be readily turned to release the parts when it is desired to separate the pitman rod and the knife head.

A further object of the invention is to provide a cam operable upon socket-carrying straps to either cause the sockets to engage a ball or spread the straps to release the ball, which cam is pivoted to one of said straps and has a cam groove to engage a part on the other strap, together with means for holding the cam in either one of its positions.

In the accompanying drawings:

Fig. 1 is a plan view of portions of a pitman rod and knife head showing the improved devices for securing them together, the parts being in the position assumed before the rod has been locked to the head.

Fig. 2 is a plan view of the parts shown in Fig. 1 but in the position when the rod and knife head have been locked together.

Fig. 3 is a side elevation of the parts illustrated in Fig. 2.

Fig. 4 is an elevation of the inner side of one of the pitman rod straps.

Fig. 5 is an elevation of the inner side of the other pitman rod strap.

Fig. 6 is a plan view of the cam.

Fig. 7 is a section on the line 7—7 of Fig. 1.

Referring to the drawings, 1 represents a portion of a pitman rod, 2 a portion of the knife head and 3 a portion of the knife which is secured to the head in any suitable way such as by the rivets 4. The pitman rod has connected therewith by rivets 5 a pair of straps, one of which is indicated at 6 and the other at 7, which straps extend beyond the rod and have at their extreme end concavo-convex members 8 which form in effect a divided socket adapted to embrace a ball 9 formed on the head 2.

The strap 6, between the end of the pitman rod and its socket member 8 is provided with a tapered slotted opening 10 which extends entirely therethrough, the inner wall of the strap having a pair of aligned ears 10'. The strap 7, between the end of the pitman rod and its socket member 8 is formed with a recess 11, the rear wall of which is of concave form as shown in dotted lines at 11', Figs. 1 and 2; the inner wall of this strap being provided with a pair of aligned ears 11''.

In the assembled position of the parts the slot 10 and recess 11 are in line with each other and form a chamber to receive a cam 12. This cam member is pivoted upon a vertically extending pin 13 carried by the ears 11'' of the strap 7, the cam having an aperture 14 which receives the pin. The ears 10' of the strap 6 carry a pin 15 which extends through a cam slot 16 in the cam 12.

Pivotally secured to the cam by a pin 17 is a clevis 18, the cam having an opening 19 which receives the pin. Connected with the clevis is a tapered stem 20 about which is placed a coil spring 21 which extends into a recess 22 in the end of the pitman rod, the spring being interposed between the rear wall of the recess and the clevis 18.

In the operation of this connection, before the pitman rod and head are clamped together the parts are in the position shown in Fig. 1 in which it will be seen that the action of the spring on the cam is such as to hold the straps 6 and 7 separated. When it is desired to operatively connect the knife head and pitman together the cam is swung sufficient to cause the spring, after the pin 17 has passed the center line, to exert an influence upon the cam to swing it into the position shown in Fig. 2. This causes the pin 15 to ride against the outer wall of the cam slot 16 so as to position the socket members 8 against the ball 9.

By this arrangement it will be seen that the spring not only exerts an influence to separate the socket members of the strap when it is on one side of the dead center line but also to exert an influence to position the socket members on the knife head ball when the spring is on the opposite side of the dead center line.

In order to move the cam sufficiently to bring the pressure of the spring on either side of the dead center line, any suitable tool may be employed to pry the cam from one position to another past the dead center line.

Having thus described my invention, I claim:

1. In a connection of the character described, a pitman rod, a pair of straps connected therewith and extending therebeyond, a knife head having a ball, socket members on said straps to engage said ball, a cam member positioned intermediate said straps between the end of said pitman rod and said ball, a pivotal connection between said cam and one of said straps, cam surfaces between said cam member and the other strap operable in one position of said cam member to hold said socket members to said ball and in another position of said cam member to spread said straps, and a coil spring pivotally connected with said cam member operable to hold said cam member in either position.

2. In a connection of the character described, a pitman rod, a pair of straps connected therewith, a knife head having a ball, socket members on said straps to engage said ball, a cam member pivoted to one of said straps, cam surfaces between said cam member and the other strap operable in one position of said cam member to hold said socket members to said ball and in another position of said cam member to spread said straps, and a coil pressure spring pivotally connected to said cam member, said spring being operable on one side or the other of the dead center line between said pivotal connections to hold said cam member in either position.

3. In a connection of the character described, a pitman rod, a pair of straps connected therewith, a knife head having a ball, socket members on said straps to engage said ball, a cam member pivoted to one of said straps having a cam slot, and a pin on the other strap extending into said cam groove, the walls of said cam groove operating upon said pin to hold said socket member to said ball or spread said straps, and a coil pressure spring pivotally connected to said cam member, said spring being operable on one side or the other of the dead center line between said pivotal connections to hold said cam member in either position.

4. In a connection of the character described, a pitman rod, a pair of straps connected therewith, a knife head having a ball, socket members on said straps to engage said ball, a cam member pivoted to one of said straps, a pin carried by one of said straps forming a pivotal connection for said cam member, said cam member having a cam slot, a pin carried by the other of said straps extending through said slot, a clevis pivotally connected with said cam member, a stem connected with said clevis, a coil spring about said stem and interposed between said clevis and the wall of a recess in the end of said pitman rod.

WILHELM VUTZ.